Oct. 9, 1934.  G. E. ROWE  1,976,193
APPARATUS FOR FEEDING MOLTEN GLASS
Original Filed March 11, 1931  2 Sheets-Sheet 1
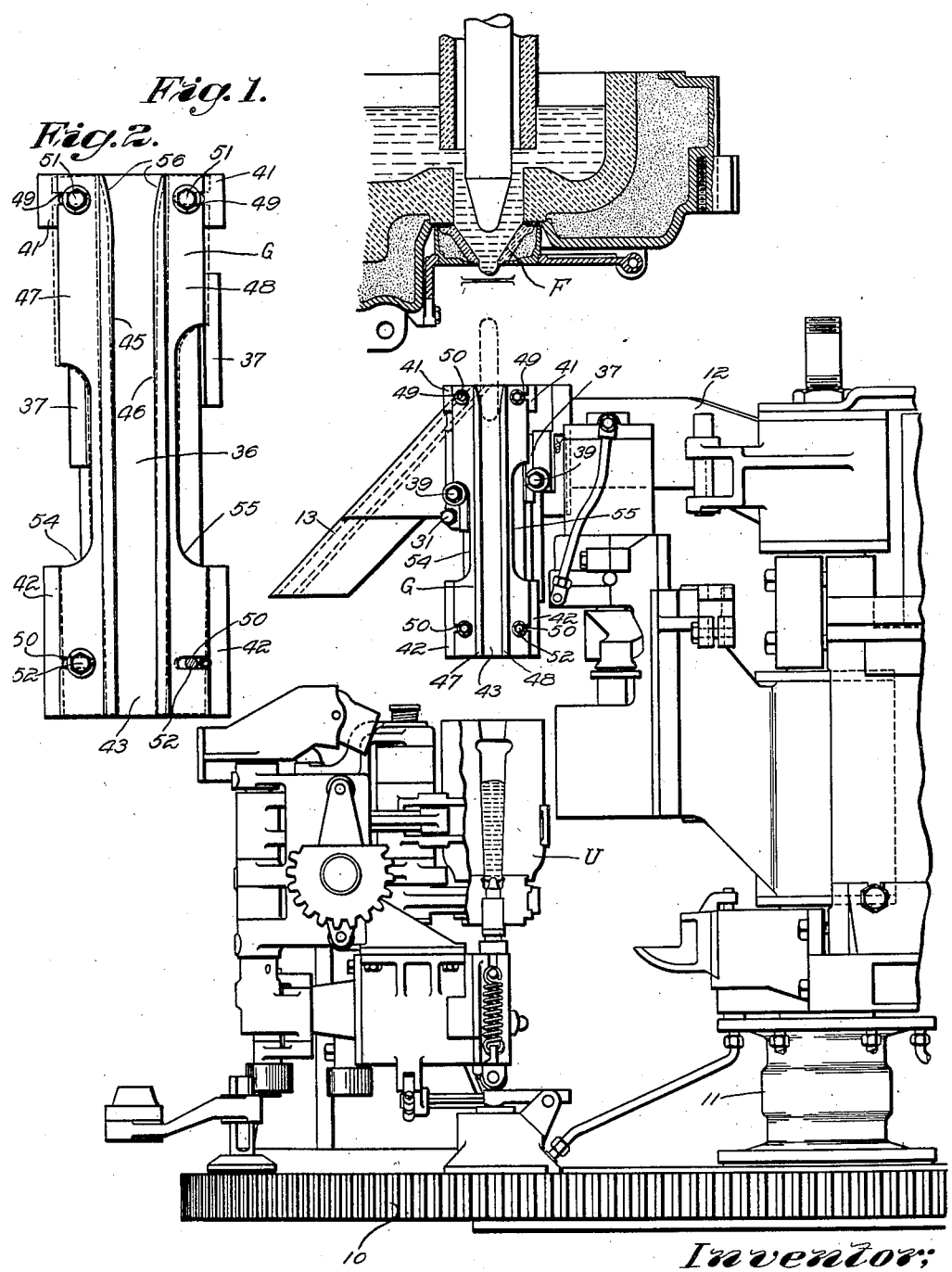
Inventor:
George E. Rowe
by Brown + Parham
Attorneys
Witness:
W. B. Thayer Oct. 9, 1934.  G. E. ROWE  1,976,193
APPARATUS FOR FEEDING MOLTEN GLASS
Original Filed March 11, 1931  2 Sheets-Sheet 2
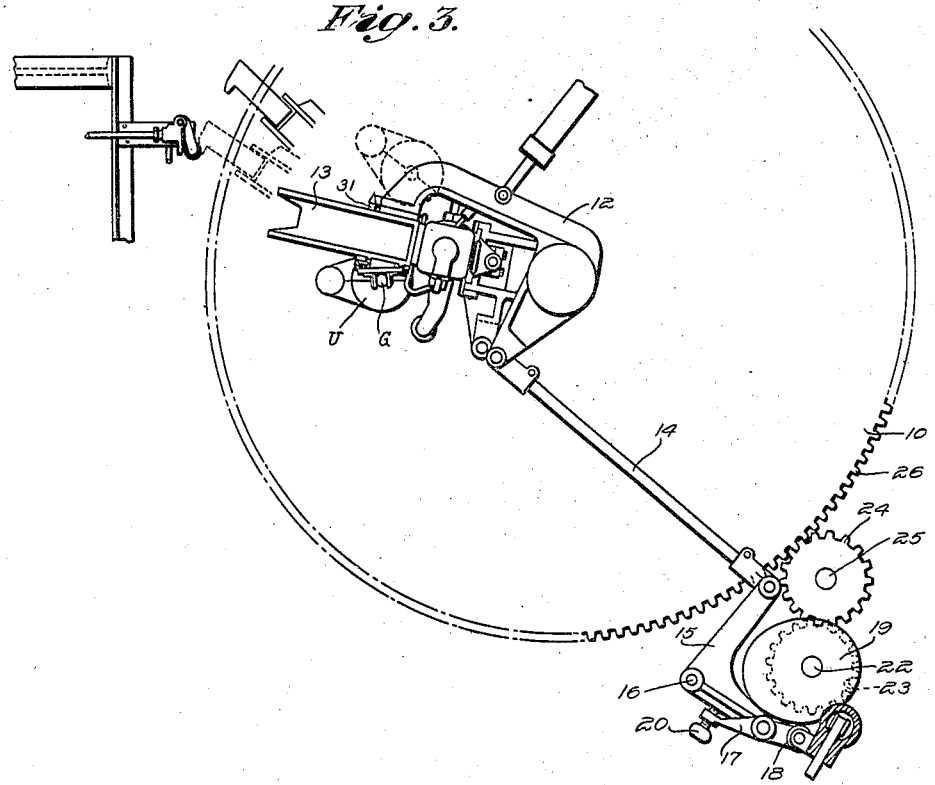
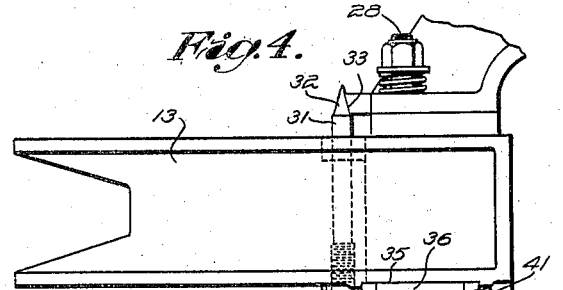
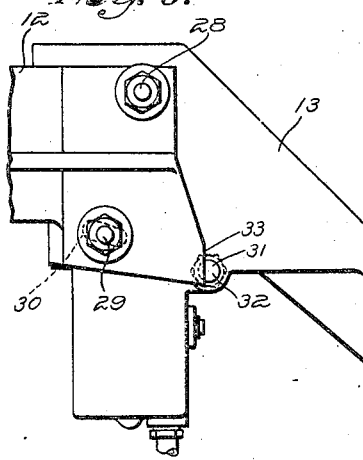
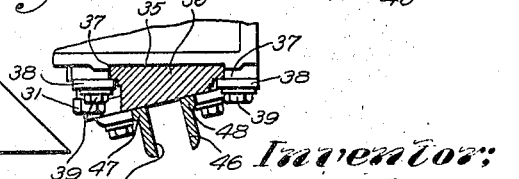

Patented Oct. 9, 1934

1,976,193

UNITED STATES PATENT OFFICE 1,976,193

APPARATUS FOR FEEDING MOLTEN GLASS

George E. Rowe, Wethersfield, Conn., assignor to Hartford-Empire Company, Hartford, Conn., a corporation of Delaware Application March 11, 1931, Serial No. 521,688
Renewed February 28, 1934

14 Claims. (Cl. 49—14)

This invention relates to apparatus for feeding molten glass and has particular relation to apparatus for guiding or directing successive charges of molten glass from a glass feeder, to inverted parison mold units of a glassware forming machine.

In the operation of apparatus of the above character, it is highly desirable to direct the charges of glass into the exact centers of the cavities of mold units, otherwise, the charges might assume angular positions in the molds, resulting in the production of imperfect parisons and finished glassware.

The charges for the molds may be given a shape by the glass feeder corresponding to the shape of the cavities in said units. In order to preserve the shape of the charges of glass thus imparted thereto so that the charges will properly fit in the mold cavities of the parison mold units, the charge guiding or directing means should be of appropriate size and shape. Heretofore, where a guide has been interposed between the glass feeder and parison mold unit, a change in the size and/or shape of the parison mold of the parison forming unit has required the substitution of a new guide or deflector for the one previously in use, in order to preserve the changed shape of the charges of glass supplied to the substituted parison mold.

Another requirement in the supplying of charges of glass to the molds of a forming machine is that the chilling effect of the charge guiding apparatus should be a minimum in order that the charges will be delivered to the mold in the best possible and most uniform thermal and physical condition to prevent or mitigate defects which might be produced in the parisons and finished articles made from the charges of glass. The above requirements apply particularly to the guiding of charges to moving parison mold units in which case the fulfillment of such requirements is very difficult; far more so than when the molds are at rest at the times that they are charged.

It is an object of this invention to provide novel apparatus for feeding charges of glass to the molds of a forming machine which is so constructed and arranged that the delivery of charges of glass exactly centrally of the cavity of a mold unit is assured, and the possibility of a charge of glass assuming an angular position in the mold unit, greatly lessened, if not altogether eliminated.

Another object of the invention is to provide a novel guide for directing charges of glass into the mold unit of a forming machine, which may be operated and utilized so as to obviate the necessity of substituting therefor guides or deflectors of different sizes and/or shapes when molds of different sizes and/or shapes are employed, and to which charges of different sizes and/or shapes are to be supplied. To those and other ends, provision may be made for varying the cross sectional area of the guide to accommodate charges of glass of varying thickness or cross section, or charges of varying shapes.

Another object of the invention is to provide a novel guide or deflector for directing charges of glass to the molds of a forming machine, of such character that the chilling effect of the guide on the charges is reduced to a minimum, and at the same time such chilling effect as may occur is uniform for all charges. That object may be realized by constructing the guide in the form of an open-sided elongate box of substantially rectangular shape in cross section, the plane surfaces of which contact with successive charges only along longitudinal lines. Such line-contact reduces the chilling effect of the guide on the charges to a minimum.

A more specific object of the invention is to provide a novel guide or charge delivery device of the above character, for directing successive charges of molten glass into the inverted parison mold units of a continuously rotating glassware forming machine. According to this object, apparatus of the invention is disclosed and described herein, and illustrated in the drawings, as embodied in a continuous glassware forming machine such as that disclosed in the copending application of Edward H. Lorenz and George E. Rowe, Ser. No. 492,407, filed Oct. 31, 1930, of which this application is a continuation in part. However, the invention is illustrated and described in that connection by way of example only. It may be used for example in charge-delivery apparatus disclosed in the patent to Karl E. Peiler No. 1,756,493, patented April 29, 1930, for the delivery of charges to continuously moving molds, or it may be used for the delivery of charges in other forms of glassware fabricating machines, whether operated continuously or intermittently, and in which charges are delivered to the molds while the molds are moving.

In order that the invention may be more clearly understood and its manifold advantages appreciated, reference should be had to the accompanying drawings which illustrate one embodiment thereof in operative relation to a continuous glassware forming machine.

In said drawings:

Figure 1 is a view principally in elevation but partly in vertical section of a glassware forming machine and a feeder, with which apparatus embodying the invention is associated;

Fig. 2 is an enlarged view in side elevation of a guide or charge delivery device embodying the invention, the arrangement and use of which is shown in Fig. 1;

Fig. 3 is a partially diagrammatic view in plan of a part of the construction shown in Fig. 1, further illustrating mechanism for supporting and actuating the charge guiding device shown in Figs. 1 and 2;

Fig. 4 is an enlarged view in top plan of a part of the construction shown in Figs. 1 and 3, and showing more clearly the construction and arrangement of the charge guiding device;

Fig. 5 is a detailed view partly in horizontal section of a portion of the construction shown in Fig. 4; and Fig. 6 is an enlarged view in rear side elevation of the construction shown in Fig. 4.

In its more general aspects, apparatus embodying the invention comprises a guide G which is supported and operated by mechanism which oscillates it in an arcuate path beneath a feeder F and above the circular path of inverted parison mold units, one of which is shown at U. Being so oscillated, the guide successively directs charges of glass into the inverted mold units with which it travels, with the minimum of impact of the guides on the charges, the guide successively being moved in vertical alignment with said units for a sufficient distance to deliver the charges thereto.

The guide G, with which this invention principally is concerned, may comprise a vertical back wall member upon which a pair of longitudinally disposed members of right-angle shape in cross-section are mounted and the vertical opposed faces of which constitute the side walls of the guide. The angle or side wall members preferably are bodily movable toward and away from each other to vary the width of the substantially rectangular opening between them to the same or to a different extent in a vertical direction.

Before proceeding with a detailed description of the guide G, the general construction of the apparatus with which said guide may be associated first is explained.

The feeder F, shown in Fig. 1, may be of suitable known construction, and may be disposed so that the orifice thereof is in vertical alignment with the circular path of the mold units, one of which is shown at U, carried by a suitable table 10 mounted for rotation about a column 11. It will be understood that as the table 10 is revolved, and a mold unit moved toward a position beneath the feeder orifice, the mold unit will be inverted into the position illustrated in Fig. 1 by suitable mechanism (not shown) provided for that purpose.

Also mounted on the column 11, near the top thereof is a support 12 adapted to be oscillated, and carrying at its outer end a cullet chute 13.

The arm or support 12 is oscillated by means of a link 14 joined to a bell crank 15 pivoted at 16 and carrying a horizontal support 17 for a cam roller 18 engaging cam 19. Support 17 is pivotally mounted on bell crank 15 and adjusted thereon by means of a thumb screw 20.

Cam 19 is mounted on a vertical shaft 22 which carries a gear 23 in mesh with a spur gear 24 on shaft 25, gear 24 in turn meshing with a gear 26 formed on the periphery of table 10.

The rotation of table 10 (effected by suitable means not shown) results in corresponding rotation of gears 24, 23 and cam 19, the latter imparting oscillation to the supporting arm 12 through the connections previously mentioned.

Cullet chute 13 is secured to the arm 12 by means of a spring-pressed pivot bolt 28, Figs. 4 and 6, and a set bolt 29 which passes through a slot 30 in the arm 12.

Upon loosening bolt 29, angular adjustment of cullet chute 13 in a vertical radial plane may be effected by turning a horizontal screw bolt 31, Figs. 1 and 4, journaled in the cullet chute 13 and having a tapered end portion 32 which bears against a cam portion or bearing surface 33 formed integrally with arm 12. See Figs. 4 and 6.

The construction so far described is similar to the charge guiding and cullet chute construction disclosed in the above-mentioned copending application of Edward H. Lorenz and George E. Rowe.

As indicated at 35 in Figs. 4 and 5, the forward side portion of cullet chute 13 is slightly recessed to provide a guideway for a vertically disposed plate 36, wedge-shaped in cross section. The plate 36 is provided with flanges 37 engaged by washers 38 on bolts 39 which serve to secure the plate to the front side of the cullet chute 13.

Member 36 is provided at its top with oppositely extending lugs or flanges 41, Figs. 1, 2 and 4 and at its bottom end with similar but vertically longer flanges 42.

The lugs or flanges 41 and 42 lie in the plane of the face 43 of block 36 which face extends at an angle to the rear face of said block, but substantially radially of the axis of the mold table 10, as shown in Fig. 3.

The front face 43 of block 36 constitutes the rear wall of an open box, the sides of which are formed by the opposed faces 45 and 46 of angle members 47 and 48 secured to the front face of block 36.

The angle members 47 and 48 are slotted near their top and bottom ends respectively as indicated at 49 and 50, Figs. 1 and 2, for the reception of pairs of bolts 51 and 52 screw threaded respectively into the upper and lower pairs of flanges 41 and 42, on block 36.

It will be seen that the front face 43 of block 36 and the opposed faces 45 and 46 of angle members 47 and 48, form a box-like guide open at the front, and of substantially rectangular shape in cross section.

As shown in Figs. 1 and 2, the oppositely extending flanges of angle members 47 and 48 are cut away respectively at 54 and 55, to provide clearance for the bolts 39 by means of which block 36 which carries said members, is secured to the cullet chute 13, as previously explained.

The upper end portion of the opposed faces 45 and 46 of angular members 47 and 48 preferably are rounded or tapered as indicated at 56 to provide an outwardly and upwardly diverging opening for the reception of charges of glass and to avoid sharp edges which might injure the charges. The diverging opening or mouth thereby provided in the guide insures that the charges will properly enter the same, and may be relied on to a certain extent slightly to compress each charge of glass in such a way that it will subsequently be retained in the guide during its passage therethrough to a mold.

Inasmuch as the guide G is secured to the cullet chute 13, oscillation of support 12 will cause corresponding oscillation of the guide in an arcuate path beneath the feeder orifice. Such oscillation will occur to an extent, at times, and at a rate depending upon the operation of cam 19, and the contour of said cam. Preferably said cam 19 is driven from the table 10 in such a manner as to synchronize the oscillation of the guide with the passage of successive mold units, such as that indicated at U, through the feeding zone.

Prior to setting the apparatus embodying the invention in operation, the guide G may be set up for operation substantially as follows:

The cullet chute and hence the guide G may be angularly adjusted in a vertical plane by means of the adjusting bolt 31, as previously explained, to align the mouth of the guide with the feeder orifice. By loosening bolts 39, the block 36 may be vertically adjusted to properly space the bottom of the guide G from the top of the mold unit, such spacing depending upon the length of the parison body mold of said unit which is to be used. When the bolts 39 are loosened, guide 35 may be raised or lowered relative to its support. Such vertical positioning of the guide may be effected in conjunction with the angular adjustment of the cullet chute and the guide to align the mouth of the guide with the feeder orifice, and/or the circular path of the mold centers.

The angular members 47 and 48 may be shifted bodily toward or away from each other to vary the cross-sectional area of the guide in accordance with the varying thickness of charges of glass to be supplied to different mold units. That is accomplished by loosening bolts 51 and 52. Moreover, said angular members may be so adjusted relative to each other that the bottom end of the faces 45 and 46 are closer than the upper ends, or vice versa, to provide a longitudinally diverging space between the faces. Thus, as shown in dotted lines in Fig. 2, the angular members may be so adjusted that the bottom end portions of faces 45 and 46 are closer than the upper end portions, the space between said faces diverging upwardly.

Irrespective of whether or not the guiding surfaces 45 and 46 are in parallel or diverging relation, it is preferred, and in fact usually essential, that the space between them, at least at the bottom of the guide, be centered radially of the column 11, over the circular path of the axis of the mold cavity, during the delivery of the charge to the mold. Thus, an imaginary center line of the guide (for a charge of given diameter) will intersect such path as also will the axis of the charge being delivered, when the sides or at least the bottom ends of the guide are in the proper positions. This condition may be attained, as when the diameter of charges is changed, by shifting members 47 and 48 toward or away from each other equal amounts in a horizontal plane, and thus changing the radial spacing of the surfaces 45 and 46 along a substantially radial line through column 11 and the imaginary center of the guide, without changing the radially centered position of the space between the surfaces. This avoids undue impact of the charges with one or the other of said surfaces and with the inner or outer surface of the mold cavity which might distort the charges and/or cause them to assume an angular or otherwise improper position in the mold.

The guide G may be properly positioned at the initial point in its arc of travel by adjusting cam roller 18 relative to bell crank 15, that being done by means of thumb screw 20. Preferably the guide is aligned with the feeder orifice at the initial point of its travel to prevent impact of the guide with the charges.

The imaginary center of the guide may shift angularly in one direction or the other, with respect to column 11, as the charges received by the guide vary in diameter, to an extent depending upon how closely the charges come to the back wall 43. Should this occur, the axial center line of a charge might then be out of angular alignment with the axis of the mold cavity though in radial alignment therewith, resulting in undue impact of the charges with the forward or rearward surfaces of the mold and angular or improper positioning of the charges in the mold. This may be avoided by properly setting screw 20 which compensates for such change in position of the axes of the charges in the guide, insuring that each new imaginary center of the guide for charges of different diameters, coincides with the axis of the mold cavity as a charge is delivered to the mold.

The guide G and its operating mechanism being properly set up, it is put into operation by starting the machine. The continuous rotation of the parison forming units causes them to be carried in inverted position beneath the feeder F and the oscillation of the guide G causes it to travel with successive units substantially in vertical axial alignment with the mold cavities therein.

The operation of the feeder F, preferably is synchronized with the movement of the molds therebeneath in such a way that as a mold unit passes beneath the feeder, a charge is supplied to the guide G, which directs the charge into the mold while traveling substantially in axial alignment therewith. The charges may be retained in the guide partly as a result of their inertia, and/or partly as a result of the compressive effect of the side of the guide on the glass, if the faces 45 and 46 are adjusted to exert compression, as previously explained.

During the passage of each charge through the guide G, it may or may not contact with the back wall or space 43 of block 36 depending upon how the guide is set up, but the charges always will contact to substantially the same extent with the side walls or faces 45 and 46 of the guide. Inasmuch as the surfaces of the guide are plane or substantially so, and the charges ordinarily are circular in cross-section, the contact of the glass with the guide will be along vertical lines where the glass engages the plane surfaces of the guide. This reduces to a minimum the chilling effect of the guide on the glass.

As previously indicated, the members 47 and 48 may be shifted relatively to each other to cause the space between them to converge more or less in a longitudinal direction. By providing the proper amount of convergence between the side walls of the guide, the charges of glass might be slightly elongated or shaped to more accurately fit the cavities of the mold unit. At the same time, the glass need not contact unduly with the surfaces of the guide, although of course the contact may be greater where the guides are positioned so as to partially or slightly shape the charges, than in the case where the shape of the charges remains unaffected as the charges pass through the guide.

The charge shaping effect of the guide is intended only to slightly supplement the shaping of the charges by the feeder and preferably the guides will be so used as not materially or permanently to change the shape of the charges.

If the molds of the forming machine are changed and such molds require charges of different thickness and/or shape, it is unnecessary with the present invention to remove the guide G and substitute another guide therefor, as previously has been requisite but merely to change the set up of the guide according to the requirements of practice. An economical reduction in equipment thereby is obtained.

The connections provided for bodily shifting the guide angularly and vertically, and for changing the cross-sectional area of the passageway between the side walls of the guide, makes it possible to insure that the charges of glass will be delivered exactly centrally into the various mold units, thereby greatly lessening the possibility of the charges assuming angular positions in the molds, or eliminating such a possibility all together.

If desired, the mounting of the guide on the pivot bolt 28 for angular adjustment in a vertical radial plane, may be omitted and the radial alignment of the guide, or at least the bottom thereof, with the mold attained by shifting members 47 and 48 equal amounts in the same direction toward or away from column 11 and relative to member 36 in which they are movably mounted.

When the diameters of the charges are changed without changing the parison mold, in order to suit the charges to the mold, members 47 and 48 may be moved toward or away from each other accordingly to insure proper delivery of the charges. This may be accomplished without disturbing the radial alignment of the guide with the mold as is obvious.

It also will be obvious that the members 47 and 48 may be shifted in the same direction or toward and away from each other as above described without stopping the operation of the machine. In order to do this, bolts 51 and 52 may be left sufficiently loose when the machine is started for such purposes, while sufficiently tight to hold the members in position, and the members moved by tapping them with a tool; or the bolts may be loosened sufficiently after the machine has started to make the desired changes in their positions.

Although the invention has been described with respect to a specific embodiment thereof, it is to be understood that changes and variations may be made in the details of construction and the operation of the illustrated embodiment without departing from the spirit of the appended claims. Thus, guides each embodying the novel features of the single guide herein disclosed and claimed may be substituted for the guides disclosed in the patent to Karl E. Peiler 1,756,493 or similar guides in other known charge delivery mechanisms, as already suggested.

Having thus described my invention, what I desire to claim and to secure by Letters Patent is:

1. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold, comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising opposed substantially plane guiding surfaces, and means holding said surfaces substantially parallel at least in a given horizontal plane and in such spaced relation as to deliver the charge to the mold without materially changing the shape of the charge.

2. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising opposed substantially plane guiding surfaces, and means holding said surfaces substantially at right angles to a line approximately radial to the axis of the carrier in the charging zone.

3. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising opposed substantially plane guiding surfaces, which surfaces are substantially parallel at least in a horizontal plane, and means movably mounting said surfaces for changing the space between said surfaces.

4. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising opposed guiding surfaces, the major portions of which are plane, and means for mounting said surfaces for movements toward and away from each other.

5. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising opposed substantially plane guiding surfaces arranged in such spaced relation as to deliver the charge to the mold without materially changing the shape of the charge, and said surfaces being substantially parallel at least in a given horizontal plane, and means for mounting said surfaces for movement toward and away from each other.

6. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising opposed substantially plane guiding surfaces substantially at right angles to a line approximately radial to the axis of the carrier in the charging zone, and means for mounting said surfaces for movement toward and away from each other.

7. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising a back wall guiding surface and opposed guiding surfaces approximately at right angles to said back wall surface, and means holding said opposed surfaces in such spaced relation as to deliver the charge to the mold without materially changing its shape.

8. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising a back wall guiding surface, opposed guiding surfaces approximately at right angles to said back wall surface, and means for mounting said opposed surfaces for movement toward and away from each other.

9. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising a back wall guiding surface, and opposed guiding surfaces substantially at right angles to said back wall surface, and means holding said surfaces in such relation that a charge passing through the guide has substantially line contact with each of them.

10. Glassware forming apparatus comprising a mold carrier, a mold thereon adapted to receive a downwardly moving charge in its cavity, means for rotating said carrier about a vertical axis to move the mold through a charging zone, and means for supplying and delivering a charge to said mold during movement of said mold comprising a feeder adapted to supply charges, a vertical guide for receiving a charge and delivering it to the moving mold, a support for the guide, and means actuating the support to move the guide relative to the mold and to cause the guide to travel laterally with the mold in the charging zone during charging, said guide comprising a back wall guiding surface and opposed substantially plane guiding surfaces approximately at right angles to the back wall surface, and means for mounting the opposed surfaces for movement relative to the back wall surface.

11. The method of delivering charges of molten glass to the cavities of a moving mold which comprises, directing preshaped charges from a feeder downwardly through, and in substantially vertical sliding contact with, a guide and into the mold, and changing the cross-sectional space of the guide when the diameters of the charges are changed, to maintain such sliding contact and to insure central delivery of the charges to the mold.

12. The method of delivering charges of molten glass to a moving mold which comprises, directing preshaped charges from a feeder downwardly through, and in substantially vertical sliding contact with, a guide and into the mold while moving the guide laterally with the mold and in radial alignment therewith, and changing the cross-sectional space of the guide when the diameters of the charges are changed without disturbing the said radial alignment of the guide with the mold, to maintain such sliding contact and to insure central delivery of the charges to the mold.

13. The method of delivering charges of molten glass to the cavities of a mold which comprises, directing preshaped charges from a feeder downwardly through a guide and approximately in vertical sliding line contact with the surfaces of the guide, to minimize chilling contact of the charges with the guide, and to deliver the charge axially of the mold, and changing the width of the guide in accordance with changes in diameter of the charges to maintain such line contact.

14. In combination with a feeder adapted to supply preshaped charges of glass, and the mold of a glassware forming machine which receives such charges, a vertical guide through which the charges pass from the feeder to the mold and with which the charges have vertical sliding contact, said guide comprising a substantially plane back wall member and substantially plane and opposed side wall members, and means for holding said side wall members in right-angular relation to the back wall member and approximately parallel to each other, said means and said opposed members being so constructed and arranged that the spaced relation of the opposed members may be changed in accordance with changes in the diameter of the charges to maintain the vertical sliding contact of such charges with the guide.

GEORGE E. ROWE.